US 12,467,381 B2
(12) United States Patent
Holroyd

(10) Patent No.: US 12,467,381 B2
(45) Date of Patent: Nov. 11, 2025

(54) VARIABLE GEOMETRY TURBINE

(71) Applicant: Cummins Ltd, London (GB)

(72) Inventor: Robert L. Holroyd, Huddersfield (GB)

(73) Assignee: Cummins Ltd, London (GB)

(*) Notice: Subject to any disclaimer, the term of this patent is extended or adjusted under 35 U.S.C. 154(b) by 0 days.

(21) Appl. No.: 18/293,723

(22) PCT Filed: Jul. 28, 2022

(86) PCT No.: PCT/GB2022/051993
§ 371 (c)(1),
(2) Date: Jan. 30, 2024

(87) PCT Pub. No.: WO2023/007172
PCT Pub. Date: Feb. 2, 2023

(65) Prior Publication Data
US 2024/0344465 A1 Oct. 17, 2024

(30) Foreign Application Priority Data
Jul. 30, 2021 (GB) ..................................... 2111046

(51) Int. Cl.
*F01D 17/14* (2006.01)
*F01D 17/16* (2006.01)
(Continued)

(52) U.S. Cl.
CPC ............. *F01D 17/16* (2013.01); *F01D 17/14* (2013.01); *F01D 25/243* (2013.01);
(Continued)

(58) Field of Classification Search
CPC .... F01D 17/143; F01D 17/167; F01D 17/165; F01D 17/16; F02B 37/24; F02B 37/22
See application file for complete search history.

(56) References Cited

U.S. PATENT DOCUMENTS 4,973,223 A * 11/1990 Franklin ............... F01D 17/167
415/157
6,401,563 B1 * 6/2002 Franklin ............... F01D 17/143
415/157
(Continued)

FOREIGN PATENT DOCUMENTS

CN 101915129 A 12/2010
GB 2462266 A 2/2010
(Continued)

OTHER PUBLICATIONS

International Preliminary Report on Patentability received for PCT Patent Application No. PCT/GB2022/051993, mailed on Feb. 8, 2024, 10 pages.
(Continued)

*Primary Examiner* — Courtney D Heinle
*Assistant Examiner* — Behnoush Haghighian
(74) *Attorney, Agent, or Firm* — Faegre Drinker Biddle & Reath LLP

(57) ABSTRACT

Nozzle rings for variable geometry turbines comprise: a generally annular wall; an inner flange; an outer flange; and two protrusions. Inner flange is generally perpendicular to the generally annular wall, from which a radially inner edge extends. Outer flange is generally perpendicular to the generally annular wall and extends from a radially outer edge of the generally annular wall. The two protrusions extend from one of the inner or outer flange towards the other one of the inner or outer flange. At least one of the two protrusions extends only partially towards the other one of the inner or outer flange. The two protrusions define a first gap therebetween. Generally annular wall and the two protrusions define a second gap therebetween to receive a support arcuate head portion during use. First gap receives
(Continued)

a support intermediate portion. The nozzle rings may be suitable for use in variable geometry turbochargers.

13 Claims, 9 Drawing Sheets

(51) Int. Cl.
    *F01D 25/24*                   (2006.01)
    *F02B 37/24*                   (2006.01)

(52) U.S. Cl.
    CPC .......... *F01D 17/143* (2013.01); *F01D 17/167* (2013.01); *F02B 37/24* (2013.01); *F05D 2220/40* (2013.01); *F05D 2230/60* (2013.01); *F05D 2240/128* (2013.01); *F05D 2270/02* (2013.01)

(56) References Cited

U.S. PATENT DOCUMENTS

| | | | |
|---|---|---|---|
| 8,070,425 B2 | 12/2011 | Roberts | |
| 8,172,516 B2 * | 5/2012 | Parker | F01D 17/143 |
| | | | 415/151 |
| 8,356,973 B2 * | 1/2013 | Morphet | F01D 17/167 |
| | | | 415/157 |
| 8,608,434 B2 * | 12/2013 | Garrett | F01D 17/16 |
| | | | 415/165 |
| 8,647,056 B2 | 2/2014 | Holroyd | |
| 8,684,677 B1 * | 4/2014 | Mann | F01D 17/16 |
| | | | 415/158 |
| 9,689,274 B2 * | 6/2017 | Garrett | F01D 17/16 |
| 2008/0089782 A1 * | 4/2008 | Parker | F01D 17/167 |
| | | | 415/150 |
| 2011/0027073 A1 * | 2/2011 | Garrett | F01D 17/143 |
| | | | 415/148 |
| 2013/0315718 A1 | 11/2013 | Parker et al. | |
| 2014/0147255 A1 * | 5/2014 | Garrett | F01D 17/16 |
| | | | 415/148 |

FOREIGN PATENT DOCUMENTS

| | | |
|---|---|---|
| GB | 2585634 A | 1/2021 |
| JP | 2018162704 A | 10/2018 |
| WO | 2009133335 A1 | 11/2009 |
| WO | 2015170106 A1 | 11/2015 |

OTHER PUBLICATIONS

International Search Report and Written Opinion for International patent application No. PCT/GB2022/051993 filed Jul. 28, 2022, mailed Oct. 10, 2022.

* cited by examiner

VARIABLE GEOMETRY TURBINE

CROSS-REFERENCE TO RELATED PATENT APPLICATIONS

This application claims priority to and is a U.S. national stage application of International Patent Application No. PCT/GB2022/051993, filed Jul. 28, 2022, which claims priority to GB Patent Application No. 2111046.5, filed on Jul. 30, 2021, the disclosures of which are hereby incorporated herein by reference in their entirety.

TECHNICAL FIELD

The present invention relates to a variable geometry turbine and component parts thereof. The variable geometry turbine may, for example, be for use in a turbocharger for an internal combustion engine. In particular, the present invention relates to a new nozzle ring for a variable geometry turbine, a new support for a nozzle ring, and a new mechanism for engagement between a nozzle ring and one or more supports.

BACKGROUND

Turbochargers are known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates a compressor wheel that is mounted on the other end of the shaft and within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine comprises a turbine chamber within which the turbine wheel is mounted, an inlet passageway defined between facing, generally annular walls arranged around the turbine chamber, an inlet volute arranged around the inlet passageway, and an outlet passageway extending from the turbine chamber. The passageways and chambers communicate in such a way that pressurised exhaust gas admitted to the inlet volute flows through the inlet passageway to the outlet passageway via the turbine and rotates the turbine wheel. It is also known to trim turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level that ensures efficient turbine operation by reducing the size of the inlet passageway.

In one known type of variable geometry turbine, an axially moveable wall member, generally referred to as a "nozzle ring", defines one wall of the inlet passageway. The position of the nozzle ring relative to a facing wall of the inlet passageway is adjustable to control an axial width of the inlet passageway. Thus, for example, as gas flowing through the turbine decreases, the inlet passageway width may also be decreased to maintain gas velocity and to optimise turbine output. Such nozzle rings comprise a generally annular wall and inner and outer axially extending flanges. The flanges extend into a cavity defined in the turbine housing, which is a part of the housing that in practice is provided by the bearing housing, which accommodates axial movement of the nozzle ring. The nozzle ring is supported by two support rods, which extend partially through the bearing housing. In this way, the displaceable nozzle ring is exposed to the hot exhaust gases used to drive the turbine. The bearing housing, however, is typically water-cooled and so the nozzle ring will generally reach a higher temperature than the housing and its temperature will also vary much more rapidly than that of the housing. As a result, the ring may expand and contract radially relative to the housing. Since the housing is provided with cooling, the spacing between the support rods may vary much less than the diameter of the nozzle ring in response to operating temperature changes. If the support rods were securely fixed to the ring, this differential expansion could only be accommodated by mechanical distortion of the interconnected components, which is not acceptable.

In efforts to address this problem, variable geometry turbines have been developed in which the support rods have been connected to the nozzle ring using a linkage mechanism which allows for limited relative movement in the radial direction. The allowed movement may be sufficient to accommodate the maximum expected differential expansion, but limited so that the mechanism is still able to position the ring accurately in the housing.

In addition to the operating requirements mentioned above, the interconnections between the ring and the rods may prevent excessive tilting of the ring relative to a plane perpendicular to the rods as this would affect the operating clearances of the linkage mechanism and thereby reduce performance. The ring may also be accurately positioned in the axial direction to ensure that the mechanism responds in a predictable manner to a control input. All this has to be achieved in a linkage mechanism that is robust enough to last for several thousands of hours running in the corrosive exhaust gas of an engine, at high temperatures, with no lubrication and in conditions in which mechanical vibration of the interconnected components is inevitable. Such performance has proved difficult to achieve.

The nozzle ring may be provided with vanes that extend into the inlet passageway and through slots provided on the facing wall of the inlet passageway to accommodate movement of the nozzle ring. Alternatively, vanes may extend from the fixed wall through slots provided in the nozzle ring. Generally the nozzle ring is supported on rods extending parallel to the axis of rotation of the turbine wheel and is moved by an actuator that axially displaces the rods. Various forms of actuators are known for use in variable geometry turbines, including pneumatic, hydraulic and electric actuators that are mounted externally of the turbocharger and connected to the variable geometry system via appropriate linkages.

It may be desirable to provide a variable geometry turbine at least partially addresses one or more problems associated with known variable geometry turbines, whether identified herein or otherwise.

SUMMARY

According to the first aspect of the present disclosure there is provided a nozzle ring for a variable geometry turbine, the nozzle ring comprising: a generally annular wall; an inner flange that is generally perpendicular to the generally annular wall, and which extends from a radially inner edge of the generally annular wall; an outer flange that is generally perpendicular to the generally annular wall, and which extends from a radially outer edge of the generally annular wall; and two protrusions extending from one of the inner or outer flange towards the other one of the inner or outer flange, at least one of the two protrusions extending only partially towards the other one of the inner or outer flange; wherein the two protrusions define a first gap therebetween; and wherein the generally annular wall and the two protrusions define a second gap between the generally annular wall and both of the two protrusions.

It will be appreciated that an axis of the nozzle ring may be defined as an axis which is perpendicular to the generally annular wall member and which passes through a centre of the generally annular wall member. Furthermore, when referring to features of the nozzle ring, the terms axial, radial and circumferential may be defined relative to this axis.

The nozzle ring according to the first aspect of the disclosure is advantageous, as now discussed. In use, the nozzle ring may be movably mounted within a variable geometry turbine. In particular, the nozzle ring may be movably mounted such that it can move axially relative to other components of the variable geometry turbine. The nozzle ring may therefore be referred to as an axially moveable wall member. The nozzle ring may define one wall of an inlet passageway for the variable geometry turbine.

As will be discussed further below, the nozzle ring may be supported by two rods extending parallel to the axis of the nozzle ring and may be moved by an actuator that axially displaces the rods. In particular, the two rods may be disposed on the same side of the annular wall member as the inner and outer flanges. Various forms of actuators are known for use in variable geometry turbines, including pneumatic, hydraulic and electric actuators that are mounted externally of the turbocharger and connected to the variable geometry system via appropriate linkages.

In use, the rods may partially extend through a bearing housing that may be cooled whereas the nozzle ring may be exposed to hot exhaust gases that are used to drive the turbine and will therefore be subject to significant thermal expansion and contraction during use. Since the housing is provided with cooling, the spacing between the rods may vary significantly less than a diameter of the nozzle ring supported by the rods in response to operating temperature changes. In efforts to address this problem, variable geometry turbines have been developed in which the rods have been connected to the nozzle ring using a linkage mechanism which allows for limited relative movement in the radial direction. The allowed movement should be sufficient to accommodate the maximum expected differential expansion, but limited so that the mechanism is still able to position the ring accurately in the housing. In addition to the operating requirements mentioned above, the interconnections between the ring and the rods must prevent excessive tilting of the ring relative to a plane perpendicular to the rods as this would affect the operating clearances of the linkage mechanism and thereby reduce performance. The ring must also be accurately positioned in the axial direction to ensure that the mechanism responds in a predictable manner to a control input. This means that the mechanism must have limited backlash to ensure proper operation and control. All this has to be achieved in a linkage mechanism that is robust enough to last for several thousands of hours running in the corrosive exhaust gas of an engine, at high temperatures, with no lubrication and in conditions in which mechanical vibration of the interconnected components is inevitable. Such performance has proved difficult to achieve.

In some existing variable geometry turbochargers, the two rods that support a nozzle ring are connected to the nozzle ring using rivets. One example arrangement is disclosed in U.S. Pat. No. 6,401,563. The ring supports a limiting stop and a cylindrical pivot for connection to each rod. A transverse elongate element is secured to one end of each rod and defines a pair of bores arranged to be aligned with the stop and pivot. The stop and pivot are secured to the ring by washers and rivets, with the transverse element retained between the ring and the washers. The pivot is a close fit in its respective bore, whereas the stop is a loose fit in its bore. Accordingly the transverse element can rotate on the pivot to an extent determined by the clearance between the stop and the wall of its bore when, during operation, the ring expands more than the housing supporting the rods. Thus, increased radial expansion of the ring as compared to the rods is accommodated by each transverse element pivoting radially inwardly.

This example known arrangement involves a number of technical challenges. First, the locations of the rivet heads on the generally annular wall restrict the possible arrangements of vanes supported thereby since the vanes need to be arranged such that they do not coincide with the position of any of the rivet heads. Second, the process of riveting can lead to some distortion of vanes, especially those disposed adjacent the rivet heads. Third, rivets may be prone to wear and cracking. Fourth, the connection of each supporting rod to the nozzle ring involves a significant number of parts which need to be accurately assembled. Fifth, the use of rivets results in a permanent or semi-permanent assembly.

The nozzle ring according to the first aspect of the disclosure is advantageous, as now discussed.

The two protrusions provide a feature for engagement with a supporting rod. The supporting rod may comprise an elongate generally cylindrical portion that may be supported in a bush or the like on a housing for linear movement relative to said housing. The supporting rod may further comprise an arcuate head portion disposed adjacent one end of the generally cylindrical portion, the head portion extending generally perpendicular to an axis of the generally cylindrical portion. Such an arrangement may engage with the two protrusions of the nozzle ring according to the first aspect of the disclosure, as now discussed. In use, the arcuate head portion may be received in the second gap between the generally annular wall and the two protrusions. An axial dimension of the arcuate head portion may generally match an axial dimension of the second gap between the generally annular wall and the two protrusions (i.e. an axial clearance between the arcuate head portion and the nozzle ring may be minimised). As such, axial movement of the supporting rod in either direction will cause the nozzle ring to move axially. A portion of the supporting rod between the arcuate head portion and the generally cylindrical portion may be received in the first gap between the two protrusions. By minimising a clearance between the two protrusions and the portion of the supporting rod between the arcuate head portion and the generally cylindrical portion, any torque applied to the nozzle ring can be carried by the surfaces of the two protrusions that define the first gap.

The two protrusions may be considered to extend from one of the inner or outer flange towards the other one of the inner or outer flange in a plane generally parallel to the generally annular wall. At least one of the two protrusions only extends partially from one of the inner or outer flange towards the other one of the inner or outer flange. That is, at least one of the two protrusions only extends radially partially from one of the inner or outer flange towards the other one of the inner or outer flange such that there is a radial gap defined between distal ends of the at least one of the two protrusions and the other one of the inner or outer flange. In some embodiments, both of the two protrusions only extend radially partially from one of the inner or outer flange towards the other one of the inner or outer flange such that there is a radial gap defined between distal ends of both of the two protrusions and the other one of the inner or outer flange. This allows the supporting rod to be engaged with the nozzle ring as follows. First, the arcuate head portion of the supporting rod is aligned radially with the radial gap defined between distal ends of the two protrusions and the other one of the inner or outer flange. Next, the supporting rod is moved axially towards the generally annular wall. Once the arcuate head portion of the supporting rod is adjacent the generally annular wall, the supporting rod is moved radially towards the two protrusions until: (a) the arcuate head portion is received in the second gap (between the generally annular wall and the two protrusions); and (b) a portion of the supporting rod between the arcuate head portion and the generally cylindrical portion is received in the first gap (between the two protrusions).

In embodiments, wherein only one of the two protrusions extends only partially from one of the inner or outer flange towards the other one of the inner or outer flange, the supporting rod to be engaged with the nozzle ring as follows. First, the arcuate head portion of the supporting rod is aligned radially with the radial gap defined between a distal end of the one protrusions that extends only partially between the inner and outer flanges and the other one of the inner or outer flange. Next, the supporting rod is moved axially towards the generally annular wall. Once the arcuate head portion of the supporting rod is adjacent the generally annular wall, the supporting rod is moved circumferentially until: a portion of the supporting rod between the arcuate head portion and the generally cylindrical portion is aligned with the first gap (between the two protrusions). Next, the supporting rod is moved radially towards the two protrusions until: (a) the arcuate head portion is received in the second gap (between the generally annular wall and the two protrusions); and (b) a portion of the supporting rod between the arcuate head portion and the generally cylindrical portion is received in the first gap (between the two protrusions).

The nozzle ring according to the first aspect of the disclosure provides a simple arrangement that allows for engagement with a supporting rod that does not use rivets. Advantageously, this avoids the problems associated with riveted arrangements, as discussed above. In particular, since there are no rivets on the generally annular wall, there is, in general, greater design freedom for the placement of vanes and/or balance apertures on the generally annular wall. Furthermore, the connection of the supporting rods to the nozzle ring is less involved and uses fewer parts. Furthermore, the nozzle ring according to the first aspect of the disclosure can be more easily disengaged from the supporting rods, which may facilitate easier replacement of only one of these parts (rather than the whole permanent or semi-permanent assembly) as desired.

Furthermore, the nozzle ring according to the first aspect of the disclosure is advantageous over existing arrangements that do not use rivets.

One example previous arrangement that does not use rivets to connect the nozzle ring to the support rods comprises an additional annular plate that is attached by welding or the like to ends of the radially inner and outer flanges that are distal to the generally annular wall. Therefore, the additional annular plate closes a face of the nozzle ring which is opposite the generally annular wall. The additional annular plate and, optionally, the inner or outer flange is provided with features for engagement with a head portion of the support rods.

The existing arrangement that does not use rivets uses an additional annular plate and the provision of features for engagement with the head portion of the support rods, both the additional annular plate and the engagement features extend the axial length of the nozzle ring assembly. This increased axial length needs to be accommodated in the turbine, potentially increasing an axial extent of the turbine. In contrast, since the nozzle ring according to the first aspect of the disclosure is provided with two protrusions from one of the inner or outer flange, the second gap (which is for receipt of the arcuate head portion of a support rod) is partially defined by the generally annular wall. Therefore, in use, the arcuate head portion of the support rods is disposed adjacent to the generally annular wall, within a cavity formed by the generally annular wall and the inner and outer flanges. Advantageously, this results in an axially compact arrangement.

Since the nozzle ring according to the first aspect of the disclosure is provided with two protrusions from one of the inner or outer flange, rather than an annular plate that must be welded onto the ends of the radially inner and outer flanges, it uses less material and is therefore less costly to manufacture than the existing arrangements that do not use rivets. In addition, the use of two protrusions from one of the inner or outer flange, rather than an annular plate that must be welded onto the ends of the radially inner and outer flanges, advantageously involves fewer manufacturing steps. Furthermore, the nozzle ring according to the first aspect of the disclosure is easier and less costly to assemble with one or more supporting rods than the existing arrangement that does not use rivets.

The two protrusions may extend from a curved surface of one of the inner or outer flange towards the other one of the inner or outer flange. The curved surface may be referred to as a side wall of the inner or outer flange. The two protrusions may extend from an interior surface of the nozzle ring.

The inner and outer flanges may extend further from the generally annular wall than the two protrusions.

That is, the two protrusions do not extend (axially) further from the generally annular wall than the inner and outer flanges. For example, the two protrusions may each be disposed at a position between the generally annular wall and distal ends of the inner and outer flanges that are remote from the generally annular wall.

The two protrusions may be integrally formed with the one of the inner and outer flanges from which they extend.

As used herein, integrally formed may mean that the material of the two protrusions and the material of the one of the inner and outer flanges from which they extend may be formed by a common manufacturing process. Additionally or alternatively, integrally formed may mean that there is no discernible join between the two protrusions and the one of the inner and outer flanges from which they extend.

Both of the two protrusions may extend only partially towards the other one of the inner or outer flange.

A radial extent of the at least one of the two protrusions extending only partially towards the other one of the inner or outer flange may be between 0.25 and 0.5 times a radial distance between the inner flange and the outer flange.

It may be generally desirable to maximise a radial extent of the two protrusions between the inner flange and the outer flange. However, it will be appreciated that this maximization may be subject to the following constraints. First, in order to engage a support with the two protrusions of the nozzle ring, as explained above, an arcuate head portion of the supporting rod may be aligned radially with the radial gap defined between distal ends of the two protrusions and the other one of the inner or outer flange and then moved axially towards the generally annular wall through this radial gap. It will be appreciated that this may impose a maximum radial extent of one of the two protrusions between the inner flange and the outer flange. Second, in some embodiments, the second gap (defined between the generally annular wall and the two protrusions) may be at least partially formed and/or finished using a cutting tool having a cutting portion that moves axially through the radial gap defined between distal ends of the two protrusions and the other one of the inner or outer flange and then radially towards the two protrusions to form or finish the second gap. Again, allowing for sufficient space for the cutting portion and any support therefor may impose a maximum radial extent of the two protrusions between the inner flange and the outer flange. In some embodiments, the protrusions may be finished and/or formed using electrochemical machining. For such embodiments, the two protrusions may be finished without the use of a cutting tool and therefore the constraint imposed by a cutting tool may not apply.

In some embodiments, the radial extent of the at least one of the two protrusions extending only partially towards the other one of the inner or outer flange may be between 0.3 and 0.5 times the radial distance between the inner flange and the outer flange. In some embodiments, the radial extent of the at least one of the two protrusions extending only partially towards the other one of the inner or outer flange may be between 0.35 and 0.45 times the radial distance between the inner flange and the outer flange. In one example embodiment, the radial extent of the at least one of the two protrusions extending only partially towards the other one of the inner or outer flange may be around 0.42 times the radial distance between the inner flange and the outer flange.

The generally annular wall may support an array of circumferentially spaced inlet vanes each of which may extend axially away from a surface of the generally annular wall opposite from the inner and outer flanges.

In use, these vanes may extend across an inlet passageway of a variable geometry turbine. The vanes may be arranged to direct gas flowing through the inlet passageway towards a direction of rotation of a turbine wheel so as to improve efficiency of the turbine. Advantageously, since rivets are not used to connect the nozzle ring to its support rods, there is greater design freedom for configuration and placement of inlet vanes.

A plurality of axially extending apertures may be provided through the generally annular wall.

In use, the plurality of axially extending apertures allow both sides of the nozzle ring to be in fluid communication. The plurality of axially extending apertures may be referred to as balance apertures or balance holes. Advantageously, since rivets are not used to connect the nozzle ring to its support rods, there is greater design freedom for configuration and placement of such axially extending apertures.

At least some of the axially extending apertures provided through the generally annular wall may be located between the inlet vanes.

The two protrusions may be referred to as a first set of two protrusions.

The nozzle ring may further comprise a second set of two protrusions extending from one of the inner or outer flange towards the other one of the inner or outer flange, at least one of the second set of two protrusions extending only partially towards the other one of the inner or outer flange; wherein the two protrusions of the second set define a third gap therebetween; and wherein the generally annular wall and the two protrusions of the second set define a fourth gap between the generally annular wall and both of the two protrusions of the second set.

The second set of protrusions may be provided on an opposite side of the nozzle ring to the first set of protrusions. The second set of protrusions may have any of the above-described features of the first set of protrusions.

The third gap defined between the two protrusions of the second set may be substantially the same as the first gap defined between the two protrusions. The fourth gap defined between the generally annular wall and both of the two protrusions of the second set may be substantially the same as the second gap defined between the generally annular wall and both of the two protrusions.

Optionally, one of the first set of protrusions may be integrally formed with one of the second set of protrusions. In some embodiments, each of the first set of protrusions may be integrally formed with a different one of the second set of protrusions.

According to the second aspect of the present disclosure there is provided a support for a nozzle ring, the support comprising: a body, the body comprising: an elongate portion; and an arcuate head portion disposed adjacent one end of the elongate portion, the head portion extending generally perpendicular to an axis of the elongate portion; wherein the arcuate head portion defines a two opposed curved surfaces and wherein at least one of the two opposed curved surfaces defines one or more protrusions therefrom.

The support according to the second aspect of the disclosure is advantageous, as now discussed.

The support according to the second aspect of the disclosure may be suitable for supporting a nozzle ring according to the first aspect of the disclosure. In particular, as discussed above in relation to the nozzle ring according to the first aspect of the disclosure, the support according to the second aspect of the disclosure may engage with the two protrusions of the nozzle ring according to the first aspect of the disclosure.

In use, the elongate generally cylindrical portion may be supported in a bush or the like on a housing for linear movement relative to said housing. The arcuate head portion may be received in the second gap between the generally annular wall and the two protrusions. An axial dimension of the arcuate head portion may generally match an axial dimension of the second gap between the generally annular wall and the two protrusions (i.e. an axial clearance between the arcuate head portion and the nozzle ring may be minimised). As such, axial movement of the support in either direction will cause the nozzle ring to move axially. A portion of the support between the arcuate head portion and the generally cylindrical portion may be received in the first gap between the two protrusions. By minimising a clearance between the two protrusions and the portion of the support between the arcuate head portion and the generally cylindrical portion, any torque applied to the nozzle ring can be carried by the surfaces of the two protrusions that define the first gap.

The elongate portion may be generally cylindrical.

The two opposed curved surfaces of the arcuate head portion may have a curvature that generally matches the inner and/or outer flange of the nozzle ring according to the first aspect of the disclosure. In use, one of the two opposed curved surfaces of the arcuate head portion may be disposed adjacent the one of the inner or outer flange from which the two protrusions extend. For example, in use, one of the two opposed curved surfaces of the arcuate head portion may be disposed adjacent the outer flange of the nozzle ring.

The one or more protrusions from at least one of the two opposed curved surfaces may extend from the one of the two opposed curved surfaces of the arcuate head portion that, in use, is disposed adjacent the one of the inner or outer flange from which the two protrusions extend.

A small clearance provided between the two protrusions of the nozzle ring and the portion of the support between the arcuate head portion and the generally cylindrical portion allows for different thermal expansion of the nozzle ring. Any torque applied to the nozzle ring is carried by the surfaces of the two protrusions that define the first gap. The torque applied to the nozzle ring will result in contact between the nozzle ring and the support and will tend to rotate the support about an axis of the elongate portion. In use, relative (radial) movement of the nozzle ring and the support can result in wear, which may undesirably increase the clearance between the two protrusions of the nozzle ring and the portion of the support between the arcuate head portion and the generally cylindrical portion.

In use, the protrusions from one of the opposed arcuate surfaces may contact an adjacent surface of the inner or outer flange of the nozzle ring of the first aspect. Such protrusions may reduce a contact area between the arcuate head portion and the inner or outer flange of the nozzle ring of the first aspect. Advantageously, it has been found that this can reduce relative movement of the support and the nozzle ring of the first aspect and therefore reduces wear of the support and the nozzle ring of the first aspect.

A bisector of the arcuate head portion in a plane perpendicular to the axis of the generally cylindrical portion may be offset from said axis.

That is, in a plane perpendicular to the axis of the generally cylindrical portion, a centre the arcuate head portion is radially offset from a centre of the generally cylindrical portion. Advantageously, such an arrangement allows the support according to the second aspect to be engaged with the nozzle ring according to the first aspect as described above such that, once the support is engaged with the nozzle ring, the axis of the generally cylindrical portion is disposed generally centrally between the inner and outer flanges of the nozzle ring. This may facilitate the retrofitting of the nozzle ring according to the first aspect and supports according to the second aspect to a known variable geometry turbine.

A recess may be defined on the end of the elongate portion adjacent the arcuate head portion. The recess may be defined on a side of the elongate portion opposite to a direction in which the bisector of the arcuate head portion is offset from said axis in the plane perpendicular to said axis.

The recess defined on a side of the generally cylindrical portion may receive one of the inner and outer flanges of the nozzle ring of the first aspect during engagement of the support with the nozzle ring. For example, the recess defined on a side of the elongate portion (which may be generally cylindrical) may receive one of the inner and outer flanges of the nozzle ring of the first aspect as the arcuate head portion of the support is moved axially towards the generally annular wall of the nozzle ring (before it is moved radially towards the two protrusions).

The body may further comprise: an intermediate portion disposed between the elongate portion and the arcuate head portion, the intermediate portion defining two parallel surfaces.

In use, the intermediate portion may be received in the first gap of the nozzle ring according to the first aspect (between the two protrusions). In use, the two parallel surfaces may each be adjacent a surface of one of the two protrusions.

The body may further comprise: a reduced diameter portion disposed between the intermediate portion and the elongate portion, the reduced diameter portion being radially inboard of the elongate portion.

For example, the reduced diameter portion may be provided by a groove formed on the elongate portion. Advantageously, this can prevent the intermediate portion from contacting a bush or the like which supports the elongate portion in use. Additionally, this reduced diameter portion can prevent the intermediate portion from contacting a finishing tool used to finish a surface of the elongate portion.

The intermediate portion may extend radially outboard of the elongate portion.

According to the third aspect of the present disclosure there is provided a support for a nozzle ring, the support comprising: a body, the body comprising: an elongate portion; and an arcuate head portion disposed adjacent one end of the elongate portion, the head portion extending generally perpendicular to an axis of the elongate portion; wherein a bisector of the arcuate head portion in a plane perpendicular to the axis of the generally cylindrical portion is offset from said axis.

According to the fourth aspect of the present disclosure there is provided an assembly comprising: a nozzle ring according to the first aspect of the present disclosure; and at least one support according to the second or third aspect of the present disclosure.

The arcuate head portion of each of the at least one supports may be received in the gap defined between the generally annular wall and a pair of two protrusions of the nozzle ring. That is, the arcuate head portion of each of the at least one supports may be received in the second gap or the fourth gap.

According to the fifth aspect of the present disclosure there is provided a kit of parts comprising: a nozzle ring according to the first aspect of the present disclosure; and at least one support according to the second or third aspect of the present disclosure.

According to the sixth aspect of the present disclosure there is provided an assembly comprising: a nozzle ring for a variable geometry turbine, the nozzle ring comprising: a generally annular wall; an inner flange that is generally perpendicular to the generally annular wall, and which extends from a radially inner edge of the generally annular wall; an outer flange that is generally perpendicular to the generally annular wall, and which extends from a radially outer edge of the generally annular wall; and two protrusions extending from one of the inner or outer flange towards the other one of the inner or outer flange, at least one of the two protrusions extending only partially towards the other one of the inner or outer flange; wherein the two protrusions define a first gap therebetween; and wherein the generally annular wall and the two protrusions define a second gap between the generally annular wall and both of the two protrusions; and at least one support for a nozzle ring, the support comprising: a body, the body comprising: an elongate portion; and an arcuate head portion disposed adjacent one end of the elongate portion, the head portion extending generally perpendicular to an axis of the elongate portion; wherein an external axial dimension of the arcuate head portion of the at least one support substantially matches an internal axial dimension of the gap defined between the generally annular wall and a pair of two protrusions of the nozzle ring.

According to the seventh aspect of the present disclosure there is provided a kit of parts comprising: a nozzle ring for a variable geometry turbine, the nozzle ring comprising: a generally annular wall; an inner flange that is generally perpendicular to the generally annular wall, and which extends from a radially inner edge of the generally annular wall; an outer flange that is generally perpendicular to the generally annular wall, and which extends from a radially outer edge of the generally annular wall; and two protrusions extending from one of the inner or outer flange towards the other one of the inner or outer flange, at least one of the two protrusions extending only partially towards the other one of the inner or outer flange; wherein the two protrusions define a first gap therebetween; and wherein the generally annular wall and the two protrusions define a second gap between the generally annular wall and both of the two protrusions; and at least one support for a nozzle ring, the support comprising: a body, the body comprising: an elongate portion; and an arcuate head portion disposed adjacent one end of the elongate portion, the head portion extending generally perpendicular to an axis of the elongate portion; wherein an external axial dimension of the arcuate head portion of the at least one support substantially matches an internal axial dimension of the gap defined between the generally annular wall and a pair of two protrusions of the nozzle ring.

According to the eighth aspect of the present disclosure there is provided a variable geometry turbine comprising: a housing; a turbine wheel supported in the housing for rotation about an axis; a nozzle ring according to the first aspect of the present disclosure; a cavity provided in the housing for receipt of the inner and outer flanges of the nozzle ring, the nozzle ring being axially movable relative to the housing to vary the extent to which the inner and outer flanges of the nozzle are received in the cavity; and an inlet passageway extending radially inwards towards the turbine wheel and defined between a face of the generally annular wall of the nozzle ring and an opposing wall of the housing, such that said axial movement of the nozzle ring relative to the housing varies the axial width of the inlet passageway.

The variable geometry turbine may further comprise at least one support according to the second or third aspect of the present disclosure.

The nozzle ring may be moveable between a fully open position and a fully closed position.

According to the ninth aspect of the present disclosure there is provided a turbocharger comprising the variable geometry turbine according to the eighth aspect of the present disclosure.

According to the tenth aspect of the present disclosure there is provided a method of manufacturing a nozzle ring for a variable geometry turbine, the method comprising: forming a manufacturing intermediate, the manufacturing intermediate comprising: a generally annular wall; an inner flange that is generally perpendicular to the generally annular wall, and which extends from a radially inner edge of the generally annular wall to a distal end of the inner flange; an outer flange that is generally perpendicular to the generally annular wall, and which extends from a radially outer edge of the generally annular wall to a distal end of the outer flange; and at least one protrusion extending from: one of the inner or outer flange partially towards the other one of the inner or outer flange; and the generally annular wall partially towards the distal ends of the inner and outer flanges; and finishing the manufacturing intermediate to form a gap between the generally annular wall and the at least one protrusion so as to form the nozzle ring.

The manufacturing intermediate may be formed by a casting process. The finishing may comprise, for example, machining (for example with a cutting tool) and/or electrochemical machining.

The method may further comprise: finishing the manufacturing intermediate to at least partially form a gap between two protrusions that extend from one of the inner or outer flange partially towards the other one of the inner or outer flange.

BRIEF DESCRIPTION OF THE DRAWINGS

Specific embodiments of the present invention will now be described, by way of example, with reference to the accompanying drawings, of which.

DETAILED DESCRIPTION

A turbocharger 1 incorporating a variable geometry turbine which could be fitted with a nozzle ring and nozzle ring supports in accordance with an embodiment of the present invention is now described with reference to FIG. 1.

Figure 1:
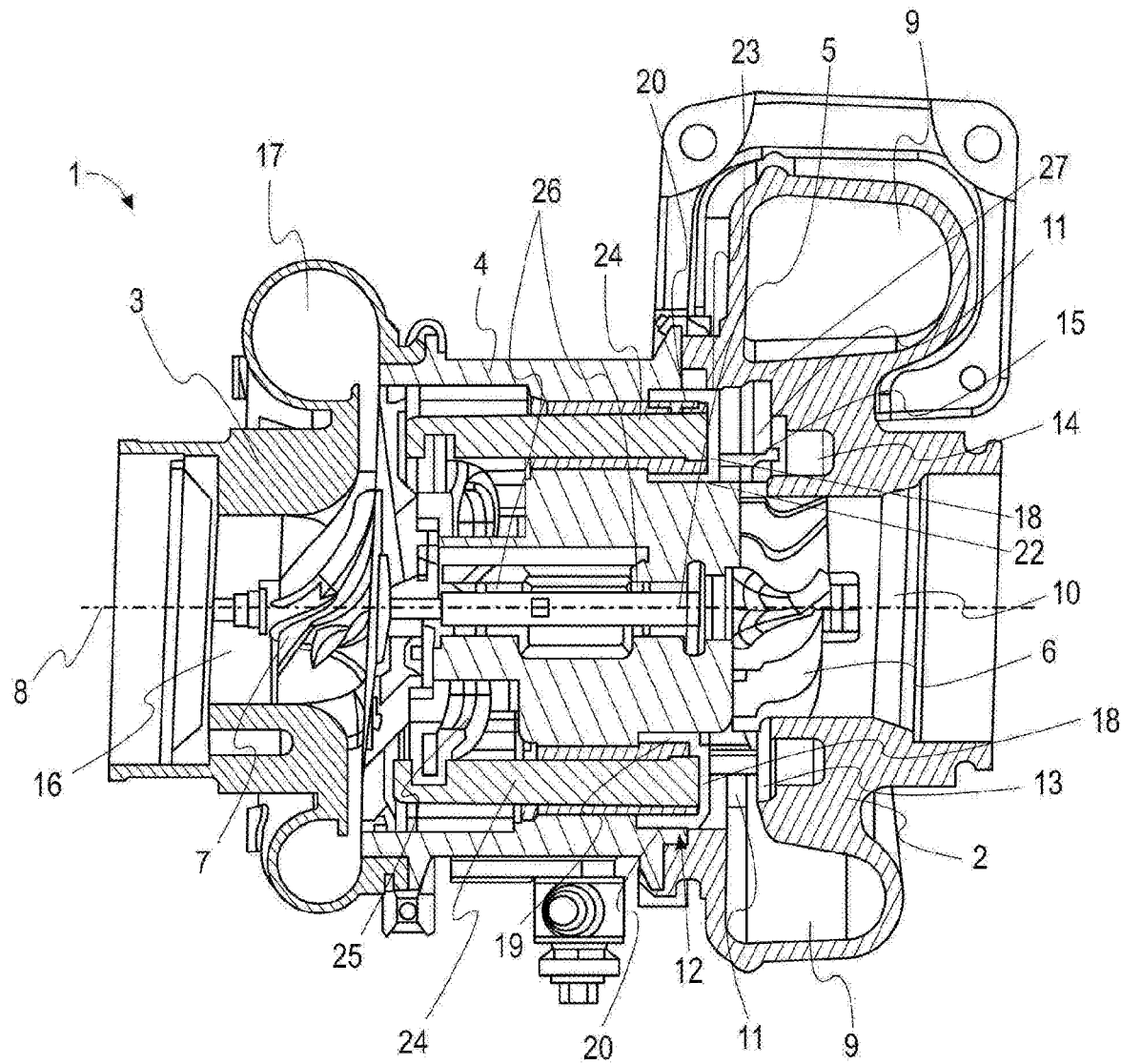
FIG. 1 is a cross-section of a turbocharger incorporating a variable geometry turbine which could be fitted with a nozzle ring and nozzle ring supports in accordance with an embodiment of the present invention.

FIG. 1 shows a turbocharger 1 incorporating a variable geometry turbine in accordance with an embodiment of the present invention. The turbocharger 1 comprises a turbine housing 2 and a compressor housing 3 interconnected by a central bearing housing 4. A turbocharger shaft 5 extends from the turbine housing 2 to the compressor housing 3 through the bearing housing 4. The shaft 5 is supported by two journal bearings 26. A turbine wheel 6 is mounted on one end of the shaft 5 for rotation within the turbine housing 2, and a compressor wheel 7 is mounted on the other end of the shaft 5 for rotation within the compressor housing 3. The shaft 5 rotates about turbocharger axis 8 on the bearings 26 located in the bearing housing 4.

It will be appreciated that the turbine housing 2 and an axial end of the bearing housing 4 together form a housing of the variable geometry turbine, in which the turbine wheel 6 is supported for rotation about turbocharger axis 8.

The turbine housing 2 defines an inlet volute 9 to which exhaust gas from an internal combustion engine (not shown) is delivered. The exhaust gas flows from the inlet volute 9 to an axial outlet passage 10 via an inlet passageway 11 and the turbine wheel 6. The inlet passageway 11 is defined between two axially spaced walls. In particular, the inlet passageway 11 is defined on one side by a face of a movable wall member 12, commonly referred to as a "nozzle ring," and on the opposite side by a shroud 13. The shroud 13 covers the opening of a generally annular recess 14 in the turbine housing 2. The movable wall member 12 may be moveable between a fully open position and a fully closed position.

As will be appreciated by the skilled person, the inlet volute 9 may comprise a generally toroidal volume (defined by the turbine housing 2) and an inlet arranged to direct exhaust gas from an internal combustion engine tangentially into the generally toroidal volume. As exhaust gas enters the inlet volute 9 it flows circumferentially around the generally toroidal volume and radially inwards towards the inlet passageway 11. In the vicinity of the inlet, there is provided a wall or "tongue" 27 which serves to separate the generally toroidal volume in the vicinity of the inlet of the volute 9 from the inlet passageway 11 of the turbine. The tongue 27 may help to guide the exhaust gas circumferentially around the generally toroidal volume and may also aid the mixing of the generally linear gas flowing into the volute 9 with the circumferential gas flow around the generally toroidal volume.

The movable wall member 12 supports an array of circumferentially spaced inlet vanes 15 each of which extends across the inlet passageway 11. The vanes 15 are orientated to deflect gas flowing through the inlet passageway 11 towards the direction of rotation of the turbine wheel 6. The shroud 13 is provided with suitably configured slots for receipt of the vanes 15 such that as the movable wall member 12 moves axially towards the shroud 13, a distal end of each of the vanes 15 moves through one of said slots and protrudes into the recess 14.

Accordingly, by appropriate control of the actuator (which may for instance be pneumatic or electric), the axial position of the movable wall member 12 can be controlled. The speed of the turbine wheel 6 is dependent upon the velocity of the gas passing through the inlet passageway 11. For a fixed rate of mass of gas flowing into the inlet passageway 11, the gas velocity is a function of the width of the inlet passageway 11, the width being adjustable by controlling the axial position of the movable wall member 12. As the width of the inlet passageway 11 is reduced, the velocity of the gas passing through it increases.

Gas flowing from the inlet volute 9 to the outlet passage 10 passes over the turbine wheel 6 and as a result torque is applied to the shaft 5 to drive the compressor wheel 7. Rotation of the compressor wheel 7 within the compressor housing 2 pressurises ambient air present in an air inlet 16 and delivers the pressurised air to an air outlet volute 17 from which it is fed to an internal combustion engine (not shown).

The movable wall member (or nozzle ring) 12 comprises a generally annular wall 18 and radially inner and outer flanges 19, 20 extending axially from the generally annular wall 18.

A cavity 21 is provided in the housing of the variable geometry turbine for receipt of the radially inner and outer flanges 19, 20 of the moveable member 12. It will be appreciated that the cavity 21 is formed on an axial end of the bearing housing 4, which cooperates with the turbine housing 2 to form the housing of the variable geometry turbine.

As the movable wall member 12 moves axially, the extent to which the radially inner and outer flanges 19, 20 of the moveable member 12 are received in the cavity 21 varies. The moveable wall member 12 is moveable between a fully opened position and a fully closed position.

Inner and outer sealing rings 22 and 23 are provided to seal the movable wall member 12 with respect to inner and outer curved surfaces of the cavity 21 respectively, whilst allowing the movable wall member 12 to slide within the cavity 21. The inner sealing ring 22 is supported within an annular groove formed in a radially inner curved surface of the cavity 21 and bears against the inner flange 19 of the movable wall member 12. The outer sealing ring 23 is supported within an annular groove formed in a radially outer curved surface of the cavity 21 and bears against the outer flange 20 of the movable wall member 12.

The movable wall member 12 is supported by two supports 24. Each of the supports being generally of the form of a shaft or rod. The two supports 24 may be referred to as push rods. Each of the two supports 24 is engages with to movable wall member 12, as discussed further below.

The supports 24 extend from the cavity 21 into the bearing housing 4 for connection to an actuation mechanism. The position of the movable wall member 12 is controlled by an actuator assembly, which may be generally of the type disclosed in U.S. Pat. No. 5,868,552. An actuator (not shown) is operable to adjust the position of the movable wall member 12 via a mechanical linkage. For example, an actuator may be connected by a lever system to a bar upon which a generally C-shaped yoke 25 is mounted. The ends of the generally C-shaped yoke engages with the two supports 24 via notches formed proximate a distal end of each of the two supports 24.

Embodiments of the present invention relate to a new engagement between a nozzle ring 12 and two supports 24 of the type shown in FIG. 1. In order to achieve this, some embodiments of the present invention relate to a new nozzle ring 112 and some embodiments of the present invention relate to new supports 124.

Figure 2A:
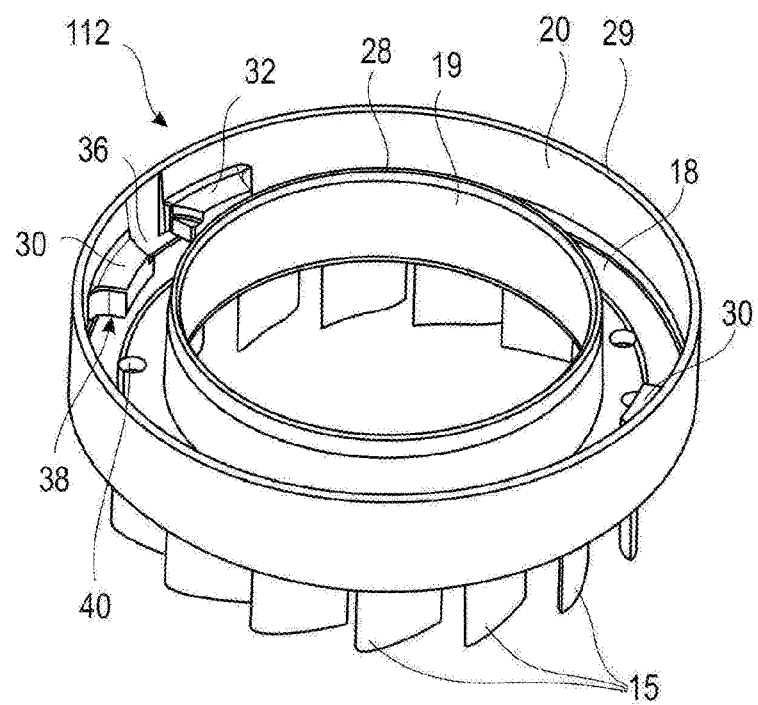
FIGS. 2A to 2C show three different views of new nozzle ring that may form part of a turbocharger of the type shown in FIG. 1.
Figure 2B:
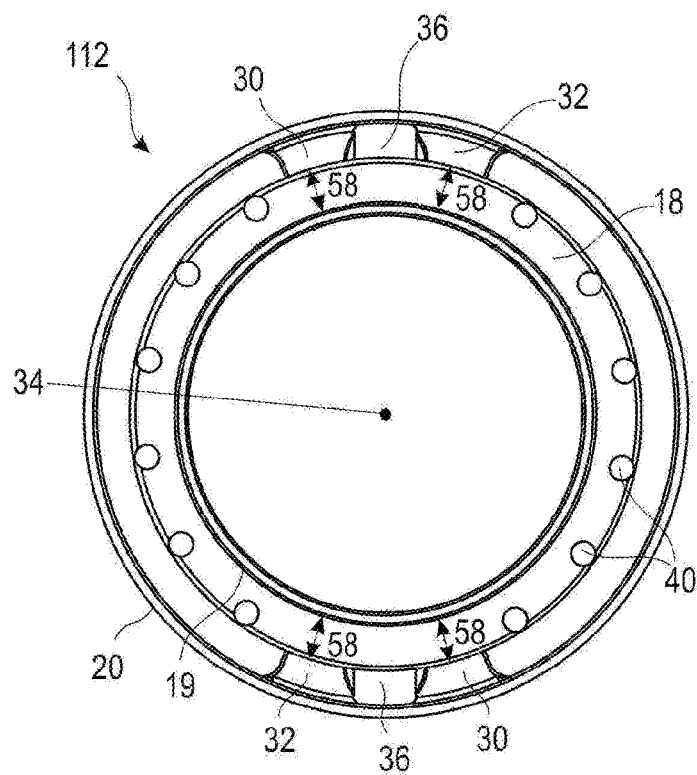
Figure 2C:
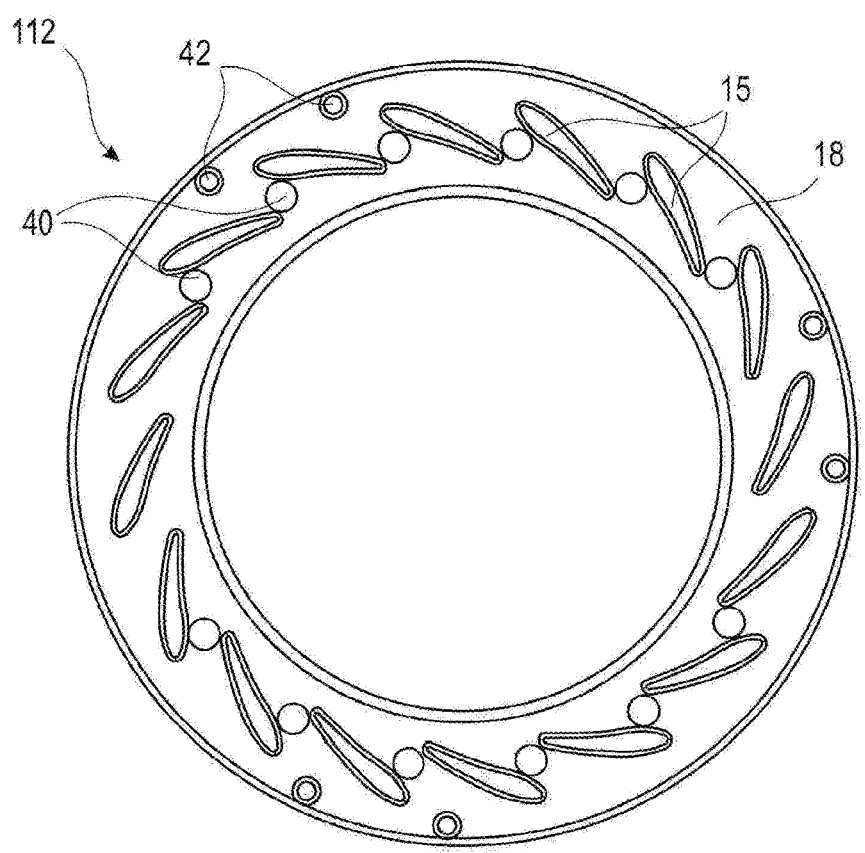

FIGS. 2A to 2C show three different views of the new nozzle ring 112. FIGS. 3A to 3D show four different views of the support 124. FIGS. 4A to 4D show the engagement between the new nozzle ring 112 and the new supports 124.

The inner flange 19 that is generally perpendicular to the generally annular wall 18, extends from a radially inner edge of the generally annular wall 18 to a distal end 28 of the inner flange 19. Similarly, the outer flange 20 that is generally perpendicular to the generally annular wall 18, extends from a radially outer edge of the generally annular wall 18 to a distal end 29 of the outer flange 20.

The new nozzle ring 112 further comprises two engagement features, each for engagement with one of the new supports 124. Each engagement feature comprises two protrusions 30, 32 extending from one of the inner or outer flange 19, 20 partially towards the other one of the inner or outer flange 19, 20. The two protrusions 30, 32 may be considered to extend from one of the inner or outer flange 19, 20 partially towards the other one of the inner or outer flange 19, 20 in a plane generally parallel to the generally annular wall 18. In the embodiment shown in FIGS. 2A to 2C, the two protrusions 30, 32 of each engagement feature extend from the outer flange 20 partially towards the inner flange 19. It will be appreciated that in other embodiments, each engagement feature may comprise two protrusions extending from the inner flange 19 partially towards the outer flange 20.

It will be appreciated that an axis 34 of the nozzle ring 112 may be defined as an axis which is perpendicular to the generally annular wall 18 and which passes through a centre of the generally annular wall 18. Furthermore, when referring to features of the nozzle ring, the terms axial, radial and circumferential may be defined relative to this axis.

The two protrusions 30, 32 extend from a curved surface of the outer flange 20 towards the inner flange 19. The curved surface may be referred to as a side wall of the outer flange 20. Therefore, the two protrusions 30, 32 extend from an interior surface of the nozzle ring 112.

The two protrusions 30, 32 are integrally formed with the outer flange 20 (from which they extend). As used herein, integrally formed may mean that the material of the two protrusions 30, 32 and the material of the outer flange 20 (from which they extend) may be formed by a common manufacturing process. Additionally or alternatively, integrally formed may mean that there is no discernible join between the two protrusions 30, 32 and the outer flange 20 (from which they extend).

The inner and outer flanges 19, 20 extend further from the generally annular wall 18 than the two protrusions 30, 32. That is, the two protrusions 30, 32 do not extend axially further from the generally annular wall 18 than the inner and outer flanges 19, 20. For example, the two protrusions 30, 32 are each disposed at a position such that, in an axial direction, they are disposed entirely between the generally annular wall 18 and the distal ends 28, 29 of the inner and outer flanges 19, 20. A first gap 36 is defined between the two protrusions 30, 32. The first gap 36 may alternatively be referred to as a first recess 36. The first gap 36 is defined by a circumferential gap between the two protrusions 30, 32. A second gap 38 is defined between the generally annular wall 18 and both of the two protrusions 30, 32. The second gap 38 may alternatively be referred to as a second recess 38. The second gap 38 is defined by an axial gap between the generally annular wall 18 and the two protrusions 30, 32.

In this embodiment, a size of the axial gap between the generally annular wall 18 and each of the two protrusions 30, 32 is the same. That is, an axial dimension of the second gap 38 is generally uniform. It will be appreciated that in alternative embodiments, an axial gap between the generally annular wall 18 and the first protrusion 30 may differ an axial gap between the generally annular wall 18 and the second protrusion 32. That is, in alternative embodiments, an axial dimension of the second gap 38 may vary around a circumference of the nozzle ring 112.

The generally annular wall 18 supports an array of circumferentially spaced inlet vanes 15 each of which extends axially away from a surface of the generally annular wall 18 opposite from the inner and outer flanges 19, 20. As discussed above with reference to FIG. 1, in use, these vanes 15 extend across an inlet passageway 11 of a variable geometry turbine. The vanes 15 may be arranged to direct gas flowing through the inlet passageway 11 towards a direction of rotation of a turbine wheel 6 so as to improve efficiency of the turbine. In this embodiment, the inlet vanes 15 are equally spaced circumferentially on the generally annular wall 18. However, in other embodiments, different arrangements of the vanes 15 may alternatively be provided on the generally annular wall 18. As discussed further below, one advantage of some embodiments disclosed herein is that greater freedom is provided over the placement of vanes 15 on the generally annular wall 18.

Figure 3A:
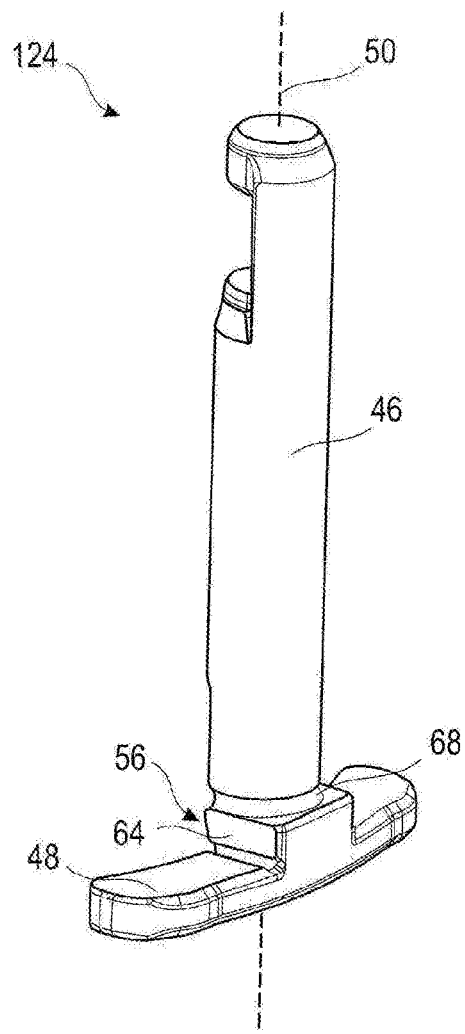
FIGS. 3A to 3D show four different views of a new support for a nozzle ring that may form part of a turbocharger of the type shown in FIG. 1.
Figure 3B:
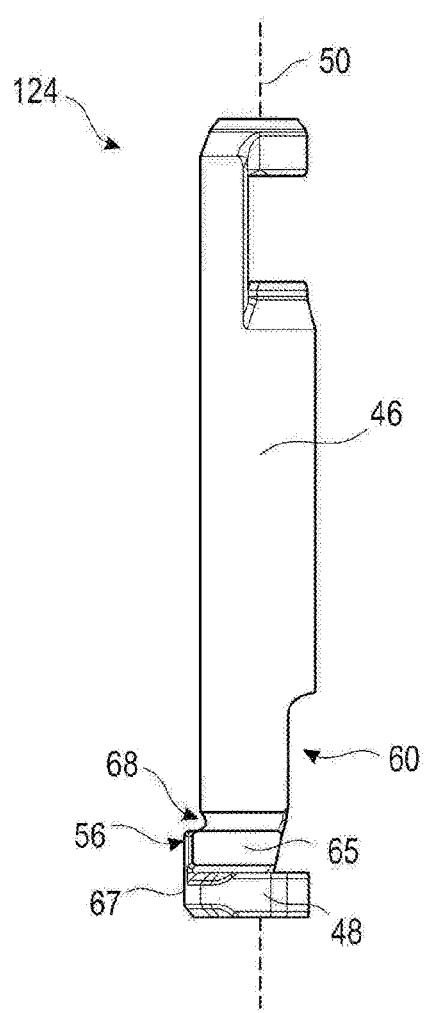
Figure 3C:
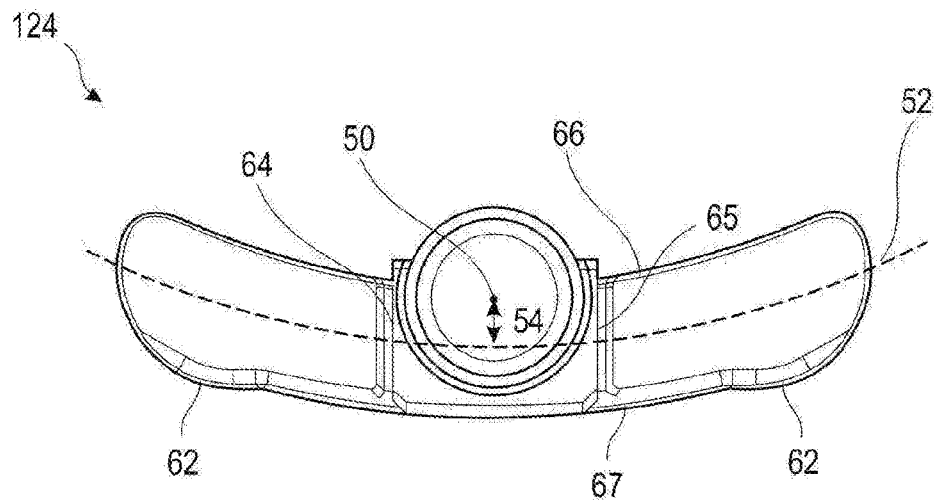
Figure 3D:
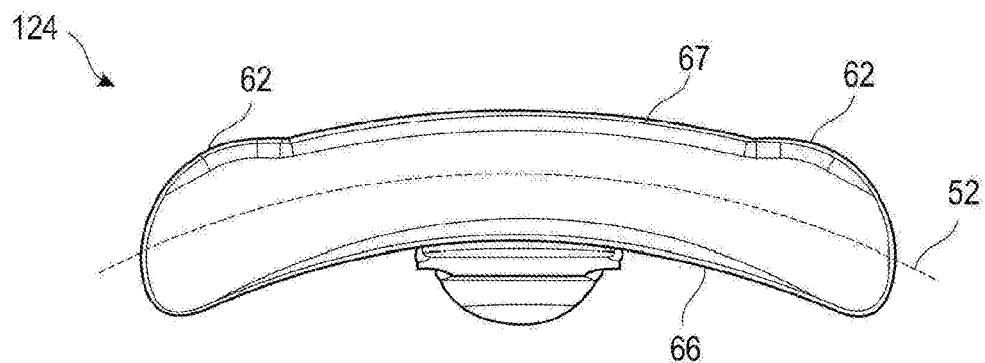
Figure 4A:
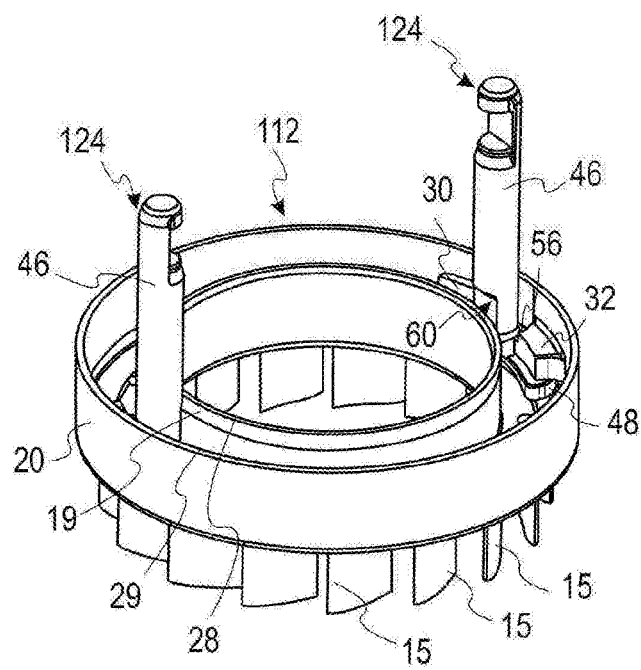
FIGS. 4A to 4D show the engagement between the new nozzle ring shown in FIGS. 2A to 2C and the support shown in FIGS. 3A to 3D.
Figure 4B:
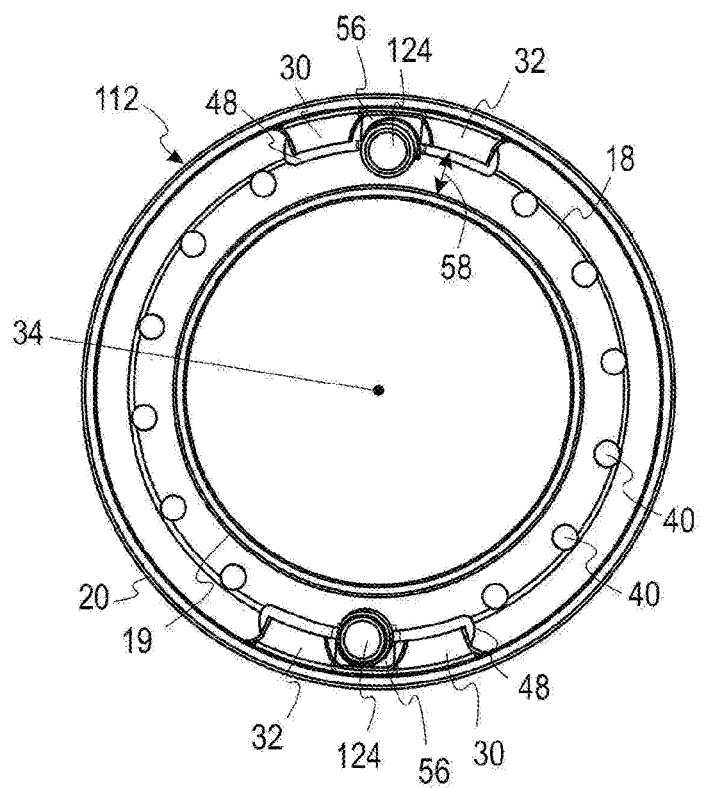
Figure 4C:
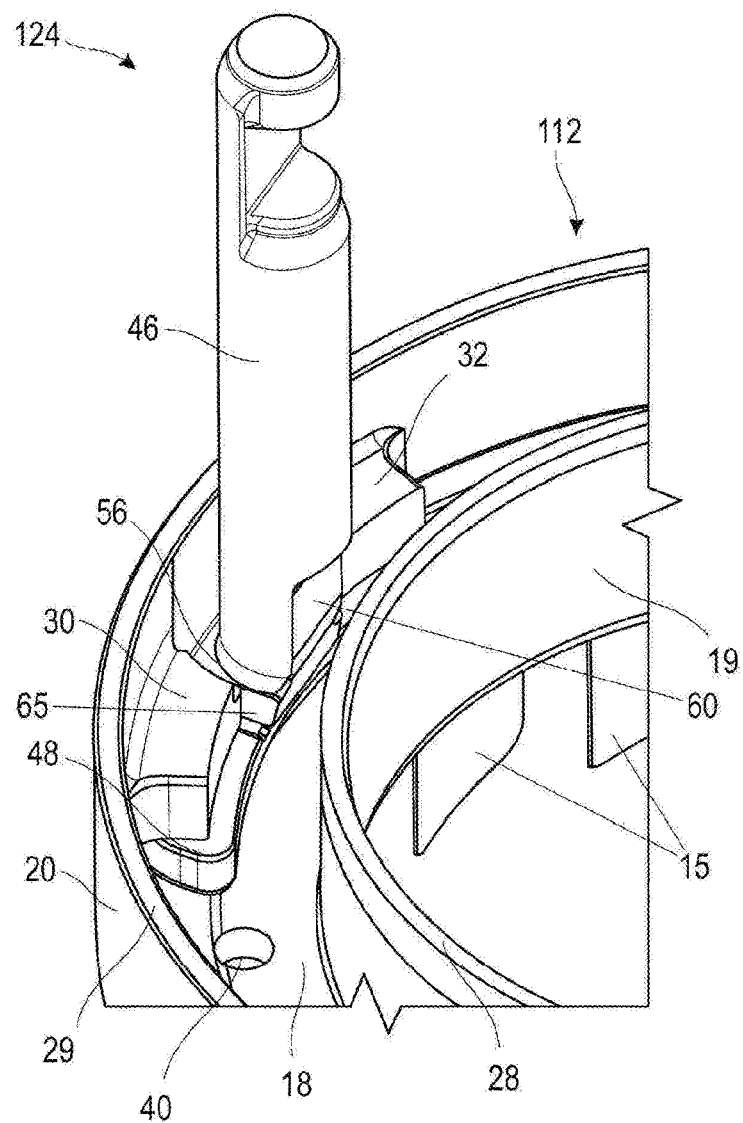
Figure 4D:
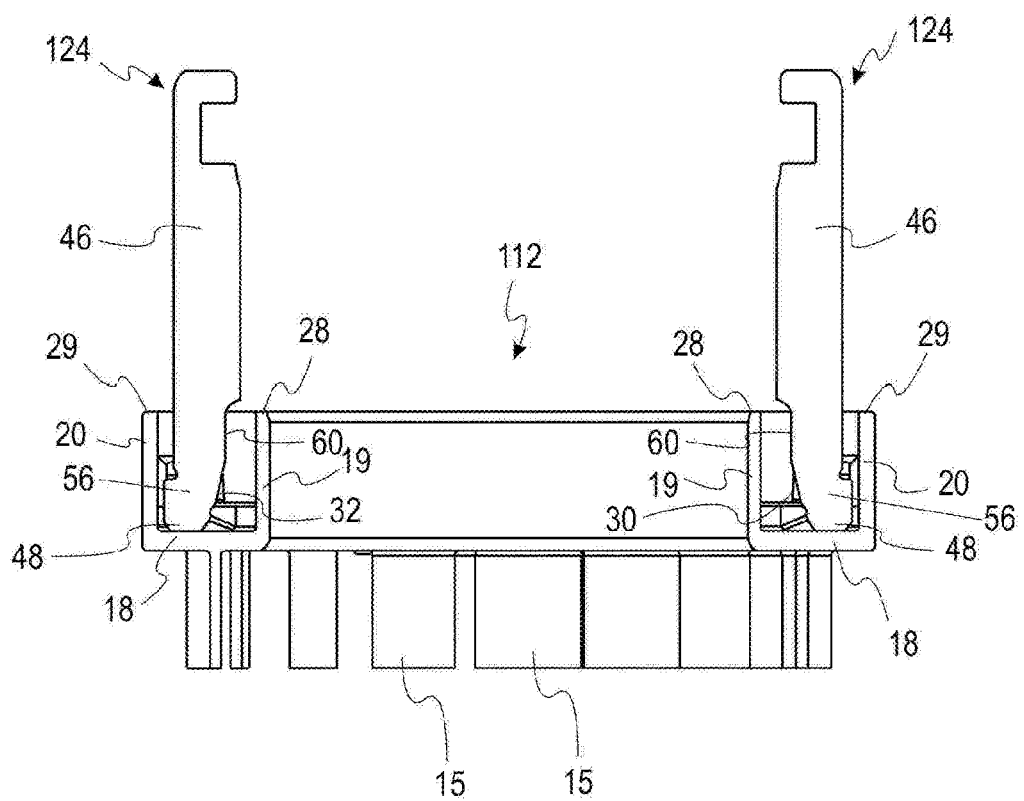

As can be seen in FIGS. 3A to 3C, optionally, a plurality of axially extending apertures 40 may be provided through the generally annular wall 18 of the moveable wall member 112. The apertures 40 may be referred to as balancing apertures 40. In use, the apertures 40 connect the inlet 11 to the cavity 21, such that the inlet 11 and the cavity 21 are in fluid communication via the apertures 40. In use, the apertures 40 serve to reduce pressure differences across the generally annular wall 18 of the nozzle ring 112 and thereby reduce loads applied to the face of the generally annular wall 18 of the nozzle ring 112.

It will be appreciated that as gas flows through the inlet passageway 11 the pressure of the gas flow drops as it moves across the face of the nozzle ring 112 towards the turbine wheel 6. Therefore, by selecting a particular radial position for the balance apertures 40, an average pressure within the cavity 21 (which will be substantially equal to the local average pressure in the inlet 11 proximate to the balance apertures 40) can be maintained.

In use, as air flows radially inwards through the turbine inlet 11, it flows between adjacent vanes 15, which can be regarded as defining a vane passage. The turbine inlet 11 has a reduced radial flow area in the region of the vane passage with the effect that the inlet gas speed increases through the vane passage with a corresponding drop in pressure in this region of the movable wall member 112. In this embodiment, the balancing apertures 40 are located between pairs of adjacent vanes 15 in the sense that the inner and outer radial extremity of these balancing apertures 112 lie within the inner or outer radial extent of the vane passage.

In addition, in alternative embodiments, optionally, a smaller number of additional balancing apertures (not shown) may be provided upstream of (i.e. at a larger radius than) the balance apertures 40 located between pairs of adjacent vanes 15. These additional balance apertures (not shown) can result in a reduction in the force amplitude at the actuator interface caused by an exhaust pulse passing through the inlet passageway 11 when compared with the provision of the balance apertures 40 located between pairs of adjacent vanes 15 alone.

As discussed further below, one advantage of some embodiments disclosed herein is that greater freedom is provided over the placement of balancing apertures 40 and additional balancing apertures on the generally annular wall 18.

Optionally, a plurality of protrusions 42 are provided on the movable wall member 112. Each of these protrusions 42 extends axially away from the same surface of the generally annular wall 18 as the inlet vanes 15 (i.e. the surface opposite from the inner and outer flanges 19, 20). A distal end of each of these protrusions 42 may be arranged to contact the shroud 13 when the movable wall member 112 is at one end of its range of axial movement. That is, each of these protrusions 42 may provide a physical stop to define one end of the range of axial movement of the movable wall member 112. This prevents the generally annular wall 18 from contacting the shroud 13 directly, which may be desirable.

The support 124 for the nozzle ring 112 comprises a body, the body comprising: an elongate generally cylindrical portion 46; and an arcuate head portion 48. The arcuate head portion 48 is disposed adjacent one end of the generally cylindrical portion 46. The head portion 48 extends generally perpendicular to an axis 50 of the generally cylindrical portion 46. The generally cylindrical portion 46 may be supported in a bush or the like on the bearing housing 4 for linear movement relative to said bearing housing 4.

Although in this embodiment the elongate portion 46 is generally cylindrical, in alternative embodiments the elongate portion 46 may have a different cross sectional shape.

As can be best seen in FIG. 3C, a bisector 52 of the arcuate head portion 48 in a plane perpendicular to the axis 50 of the generally cylindrical portion 46 is offset from said axis 50 by an offset 54.

The new nozzle ring 112 is advantageous, as now discussed. As will be discussed further below, the nozzle ring 112 may be supported by two supports 124 extending parallel to the axis 34 of the nozzle ring 112 and may be moved by an actuator that axially displaces the rods 124. The two rods are disposed on the same side of the nozzle ring 112 as the inner and outer flanges 19, 20.

In use, the supports 124 partially extend through a bearing housing 4 that may be cooled whereas the nozzle ring 112 may be exposed to hot exhaust gases that are used to drive the turbine wheel 6 and will therefore be subject to significant thermal expansion and contraction during use. Since the housing 4 is provided with cooling, a spacing between the supports 124 may vary significantly less than a diameter of the nozzle ring 112 supported by the supports 124 in response to operating temperature changes. In efforts to address this problem, variable geometry turbines have been developed in which the nozzle ring is connected to its supports using a linkage mechanism which allows for limited relative movement in the radial direction. The allowed movement should be sufficient to accommodate the maximum expected differential expansion, but limited so that the mechanism is still able to position the nozzle ring 112 accurately in the housing. In addition to the operating requirements mentioned above, the interconnections between the nozzle ring and the supports should prevent excessive tilting of the nozzle ring relative to a plane perpendicular to the supports as this would affect the operating clearances of the linkage mechanism and thereby reduce performance. The nozzle ring should also be accurately positioned in the axial direction to ensure that the mechanism responds in a predictable manner to a control input. This means that the mechanism should have limited backlash to ensure proper operation and control. All this has to be achieved in a linkage mechanism that is robust enough to last for several thousands of hours running in the corrosive exhaust gas of an engine, at high temperatures, with no lubrication and in conditions in which mechanical vibration of the interconnected components is inevitable. Such performance has proved difficult to achieve.

In some existing variable geometry turbochargers, two rods that support a nozzle ring are connected to the nozzle ring using rivets. One example arrangement is disclosed in U.S. Pat. No. 6,401,563. The nozzle ring supports a limiting stop and a cylindrical pivot for connection to each rod. A transverse elongate element is secured to one end of each rod and defines a pair of bores arranged to be aligned with the stop and pivot. The stop and pivot are secured to the ring by washers and rivets, with the transverse element retained between the ring and the washers. The pivot is a close fit in its respective bore, whereas the stop is a loose fit in its bore. Accordingly the transverse element can rotate on the pivot to an extent determined by the clearance between the stop and the wall of its bore when, during operation, the ring expands more than the housing supporting the rods. Thus, increased radial expansion of the ring as compared to the rods is accommodated by each transverse element pivoting radially inwardly.

The arrangement disclosed in U.S. Pat. No. 6,401,563 involves a number of technical challenges. First, the locations of the rivet heads on the generally annular wall restrict the possible arrangements of vanes supported thereby since the vanes need to be arranged such that they do not coincide with the position of any of the rivet heads. Second, the process of riveting can lead to some distortion of vanes, especially those disposed adjacent the rivet heads. Third, rivets may be prone to wear and cracking. Fourth, the connection of each supporting rod to the nozzle ring involves a significant number of parts which need to be accurately assembled. Fifth, the use of rivets results in a permanent or semi-permanent assembly.

The new nozzle ring 112 is advantageous, as now discussed. The two protrusions 30, 32 provide a feature for engagement with a support 124. In particular, as shown in FIGS. 4A to 4D, the arcuate head portion 48 of the support 124 may be received in the second gap 38 between the generally annular wall 18 and the two protrusions 30, 32. An axial dimension of the arcuate head portion 48 may generally match an axial dimension of the second gap 38 between the generally annular wall 18 and the two protrusions 30, 32. A small axial clearance between the arcuate head portion 48 and the nozzle ring 112 may be provided to allow for differential thermal expansion of the nozzle ring 112 and the supports 124 whilst still providing accurate control over a position of the nozzle ring in use. With such an arrangement, axial movement of the supports 124 in either direction will cause the nozzle ring 112 to move axially.

An intermediate portion 56 of the support 124 between the arcuate head portion 48 and the generally cylindrical portion 46 is, in use, received in the first gap 34 between the two protrusions 30, 32. By minimising a clearance between the two protrusions 30, 32 and the intermediate portion 56 of the support 124 any torque applied to the nozzle ring 112 can be carried by the surfaces of the two protrusions 30, 32 that define the first gap 36.

The intermediate portion 56 defines two parallel surfaces 64, 65. In use, the intermediate portion 56 is received in the first gap 36 of the nozzle ring 112 (between the two protrusions 30, 32). In use, the two parallel surfaces 64, 65 may each be adjacent a surface of one of the two protrusions 30, 32.

The intermediate portion 56 extends radially outboard of the generally cylindrical portion 46.

The body of the support body further comprises: a reduced diameter portion 68 disposed between the intermediate portion 56 and the elongate generally cylindrical portion 46. The reduced diameter portion 68 is radially inboard of the generally cylindrical portion 46. In the shown example, the reduced diameter portion 68 is provided by a groove formed on the elongate generally cylindrical portion 46. Advantageously, this can prevent the intermediate portion 56 from contacting a bush or the like which supports the elongate generally cylindrical portion 46 in use. Additionally, this reduced diameter portion 68 can prevent the intermediate portion 56 from contacting a finishing tool used to finish a surface of the elongate portion 46.

The two protrusions 30, 32 only extend partially from one of the inner or outer flange 19, 20 towards the other one of the inner or outer flange 19, 20. That is, the two protrusions 30, 32 only extend radially partially from one of the inner or outer flange 19, 20 towards the other one of the inner or outer flange 19, 20 such that there is a radial gap 58 defined between distal ends of the two protrusions 19, 20 and the other one of the inner or outer flange 19, 20. This allows the supporting rod 124 to be engaged with the nozzle ring 112 as follows. First, the arcuate head portion 48 of the supporting rod 124 is aligned radially with the radial gap 58 defined between distal ends of the two protrusions 30, 32 and the other one of the inner or outer flange 19, 20. Next, the supporting rod 124 is moved axially towards the generally annular wall 18. Once the arcuate head portion 48 of the supporting rod 124 is adjacent the generally annular wall 18, the supporting rod 124 is moved radially towards the two protrusions 30, 32 until: (a) the arcuate head portion 48 is received in the second gap 38 (between the generally annular wall 18 and the two protrusions 30, 32); and (b) the intermediate portion 56 of the supporting rod 124 is received in the first gap 36 (between the two protrusions 30, 32).

In this embodiment, both of the two protrusions 30, 32 only extend radially partially from the outer flange 20 towards the inner flange 19 such that there is a radial gap defined between distal ends of both of the two protrusions 30, 32 and the inner flange 20. In some alternative embodiments, only one of the two protrusions 30, 32 extends only partially from one of the inner or outer flange 19, 20 towards the other one of the inner or outer flange 19, 20 (and the other one of the two protrusions extends fully from one of the inner or outer flange 19, 20 towards the other one of the inner or outer flange 19, 20). For such alternative embodiments, the supporting rod 124 can be engaged with the nozzle ring 112 as follows. First, the arcuate head portion 48 of the supporting rod 124 is aligned radially with the radial gap defined between a distal end of the one protrusion that extends only partially between the inner and outer flanges 19, 20 and the other one of the inner or outer flange 19, 20. Next, the supporting rod 124 is moved axially towards the generally annular wall 18. Once the arcuate head portion 48 of the supporting rod is adjacent the generally annular wall 18, the supporting rod 124 is moved circumferentially until: the intermediate portion 56 of the supporting rod 124 is aligned with the first gap 36 (between the two protrusions). Next, the supporting rod 124 is moved radially towards the two protrusions until: (a) the arcuate head portion 48 is received in the second gap 38 (between the generally annular wall 18 and the two protrusions); and (b) the intermediate portion 56 of the supporting rod 124 is received in the first gap 36 (between the two protrusions).

The nozzle ring 112 provides a simple arrangement that allows for engagement with a supporting rod 124 that does not use rivets. Advantageously, this avoids the problems associated with riveted arrangements, as discussed above. In particular, since there are no rivets on the generally annular wall 28, there is, in general, greater design freedom for the placement of vanes 15 and/or balance apertures 40 on the generally annular wall 18. Furthermore, the connection of the supporting rods 124 to the nozzle ring 112 is less involved and uses fewer parts. Furthermore, the nozzle ring 112 can be more easily disengaged from the supporting rods 124, which may facilitate easier replacement of only one of these parts (rather than the whole permanent or semi-permanent assembly) as desired.

Furthermore, the nozzle ring 112 is advantageous over existing arrangements that do not use rivets.

One example previous arrangement that does not use rivets to connect the nozzle ring to the support rods comprises an additional annular plate that is attached by welding or the like to ends of the radially inner and outer flanges that are distal to the generally annular wall. Therefore, the additional annular plate closes a face of the nozzle ring which is opposite the generally annular wall. The additional annular plate and, optionally, the inner or outer flange is provided with features for engagement with a head portion of the support rods.

Therefore, the existing arrangement that does not use rivets uses an additional annular plate and the provision of features for engagement with the head portion of the support rods. Both the additional annular plate and the engagement features extend the axial length of the nozzle ring assembly. This increased axial length needs to be accommodated in the turbine, potentially increasing an axial extent of the turbine. In contrast, since the nozzle ring 112 of this disclosure is provided with two protrusions 30, 32 from one of the inner or outer flange 19, 20, the second gap 38 (which is for receipt of the arcuate head portion 48 of a support rod 124) is partially defined by the generally annular wall 18. Therefore, in use, the arcuate head portion 48 of the support rods 124 is disposed adjacent to the generally annular wall 18, within a cavity formed by the generally annular wall 18 and the inner and outer flanges 19, 20. Advantageously, this results in an axially compact arrangement.

Since the nozzle ring 112 is provided with two protrusions 30, 32 from one of the inner or outer flange 19, 20, rather than an annular plate that must be welded onto the distal ends 28, 29 of the radially inner and outer flanges 19, 20, it uses less material and is therefore less costly to manufacture than the existing arrangements that do not use rivets. In addition, the use of two protrusions 30, 32 from one of the inner or outer flange 19, 20, rather than an annular plate that must be welded onto the distal ends 28, 29 of the radially inner and outer flanges 19, 20, advantageously involves fewer manufacturing steps. Furthermore, the nozzle ring 112 is easier and less costly to assemble with one or more supporting rods 124 than the existing arrangement that does not use rivets.

In use, the elongate generally cylindrical portion 46 of the support 124 may be supported in a bush or the like on a housing (for example bearing housing 4 shown in FIG. 1) for linear movement relative to said housing.

As discussed above, the bisector 52 of the arcuate head portion 48 in a plane perpendicular to the axis 50 of the generally cylindrical portion 46 is offset from said axis 50. That is, in a plane perpendicular to the axis 50 of the generally cylindrical portion 46, a centre of the arcuate head portion 48 is radially offset from a centre of the generally cylindrical portion 46. Advantageously, such an arrangement allows the support 124 to be engaged with the nozzle ring 112 as described above such that, once the support 124 is engaged with the nozzle ring 112, the axis 50 of the generally cylindrical portion 46 is disposed generally centrally between the inner and outer flanges 19, 20 of the nozzle ring. This may facilitate the retrofitting of the new nozzle ring 112 and supports 124 to a known variable geometry turbine.

It may be generally desirable to maximise a radial extent of the two protrusions 30, 32 between the inner flange and the outer flange 19, 20. However, it will be appreciated that this maximization may be subject to the following constraints. First, in order to engage a support 124 with the two protrusions 30, 32 of the nozzle ring 112, as explained above, an arcuate head portion 48 of the supporting rod 112 may be aligned radially with the radial gap 58 defined between distal ends of the two protrusions 30, 32 and the other one of the inner or outer flange 19, 20 and then moved axially towards the generally annular wall 18 through this radial gap 58. It will be appreciated that this may impose a maximum radial extent of at least one of the two protrusions 30, 32 between the inner flange and the outer flange. Second, in some embodiments, the second gap 38 (defined between the generally annular wall 18 and the two protrusions 30, 32) may be at least partially formed and/or finished using a cutting tool having a cutting portion that moves axially through the radial gap 58 defined between distal ends of the two protrusions 30, 32 and the other one of the inner or outer flange 19, 20 and then radially towards the two protrusions 30, 32 to form or finish the second gap 38. Again, allowing for sufficient space for the cutting portion and any support therefor may impose a maximum radial extent of the two protrusions 30, 32 between the inner flange and the outer flange 19, 20. In some embodiments, the protrusions 30, 32 may be finished and/or formed using electrochemical machining. For such embodiments, the two protrusions 30, 32 may be finished without the use of a cutting tool and therefore the constraint imposed by a cutting tool may not apply.

In some embodiments, the radial extent of the two protrusions 30, 32 may be between 0.25 and 0.5 times the radial distance between the inner flange and the outer flange 19, 20. In some embodiments, the radial extent of the two protrusions 30, 32 may be between 0.3 and 0.5 times the radial distance between the inner flange and the outer flange 19, 20. In some embodiments, the radial extent of the two protrusions 30, 32 may be between 0.35 and 0.45 times the radial distance between the inner flange and the outer flange 19, 20. In the example embodiment shown in FIGS. 2A to 4D, the radial extent of the two protrusions 30, 32 is around 0.42 times the radial distance between the inner flange and the outer flange 19, 20.

As best shown in FIG. 3B, a recess 60 is defined on the end of the elongate generally cylindrical portion 46 adjacent the arcuate head portion 48. The recess 60 is defined on a side of the generally cylindrical portion 46 opposite to a direction in which the bisector 52 of the arcuate head portion 48 is offset from the axis 50 of the elongate generally cylindrical portion 46 (in the plane perpendicular to said axis 50).

The recess 60 defined on a side of the generally cylindrical portion 46 may receive one of the inner and outer flanges 19, 20 of the nozzle ring 112 during engagement of the support 124 with the nozzle ring 112. For example, in the shown embodiment, the recess 60 defined on a side of the generally cylindrical portion 46 may receive the inner flange 19 of the nozzle ring 112 as the arcuate head portion 48 of the support 124 is moved axially towards the generally annular wall 18 of the nozzle ring 112 (before it is moved radially towards the two protrusions 30, 32).

The arcuate head portion 48 defines two opposed curved surfaces 66, 67. At least one of the two opposed curved surfaces 66, 67 defines one or more anti-wear protrusions 62 therefrom, as now discussed.

The two anti-wear protrusions 62 are defined on a surface 67 that, in use, is adjacent the outer flange 20 of the nozzle ring 112. Such protrusions 62 may, in use, contact a surface of outer flange 20 of the nozzle ring 112.

The two protrusions 62 are each disposed proximate a different end of the arcuate head portion 48.

The two opposed curved surfaces 66, 67 of the arcuate head portion 48 may have a curvature that generally matches the inner and/or outer flange 19, 20 of the nozzle ring 112. In use, one of the two opposed curved surfaces 67 of the arcuate head portion 48 is disposed adjacent the outer flange 20 (from which the two protrusions 30, 32 extend). A small clearance provided between the two protrusions 30, 32 of the nozzle ring 112 and the intermediate portion 56 of the support 124 allows for different thermal expansion of the nozzle ring 112 (relative to the two supports 124). Any torque applied to the nozzle ring 112 is carried by the surfaces of the two protrusions 30, 32 that define the first gap 36. The torque applied to the nozzle ring 112 will result in contact between the nozzle ring 112 and the support 124 and will tend to rotate the support 124 about the axis 50 of the elongate portion 46. In use, relative (radial) movement of the nozzle ring 112 and the support 124 can result in wear, which may undesirably increase the clearance between the two protrusions 30, 32 of the nozzle ring 112 and the intermediate portion 56 of the support 124. In use, the anti-wear protrusions 62 from one arcuate surfaces 67 of the arcuate head portion 48 may contact an adjacent surface of the outer flange 20 of the nozzle ring 112. Such protrusions 62 reduce a contact area between the arcuate head portion 48 and the outer flange 20 of the nozzle ring 112. Advantageously, it has been found that this can reduce relative movement of the support 124 and the nozzle ring 112 and therefore reduces wear of the support 124 and the nozzle ring 112.

According to some embodiments, there is provided an assembly comprising: the nozzle ring 112 and at least one support 124 (for example two supports 124). The arcuate head portion 48 of each of the at least one supports 124 may be received in the second gap 38 defined between the generally annular wall 18 and a pair of two protrusions 30, 32 of the nozzle ring 112. According to some embodiments, there is provided a kit of parts comprising: the nozzle ring 112 and at least one support 124 (for example two supports 124).

According to some embodiments, there is provided a method of manufacturing a nozzle ring 112 for a variable geometry turbine. The method may comprise forming a manufacturing intermediate, which is substantially the same form as the nozzle ring 112 described above except that there is no second gap 38 defined between the two protrusions 30, 32 and the generally annular wall 18. That is, the protrusions 30, 32 extend from the generally annular wall 18 partially towards the distal ends 28, 29 of the inner and outer flanges 19, 20. The method may further comprise finishing or machining the manufacturing intermediate to form the second gap 38 between the generally annular wall 18 and the protrusion 30, 32 so as to form the nozzle ring 112. The manufacturing intermediate may be formed by a casting process.

Figure 5:
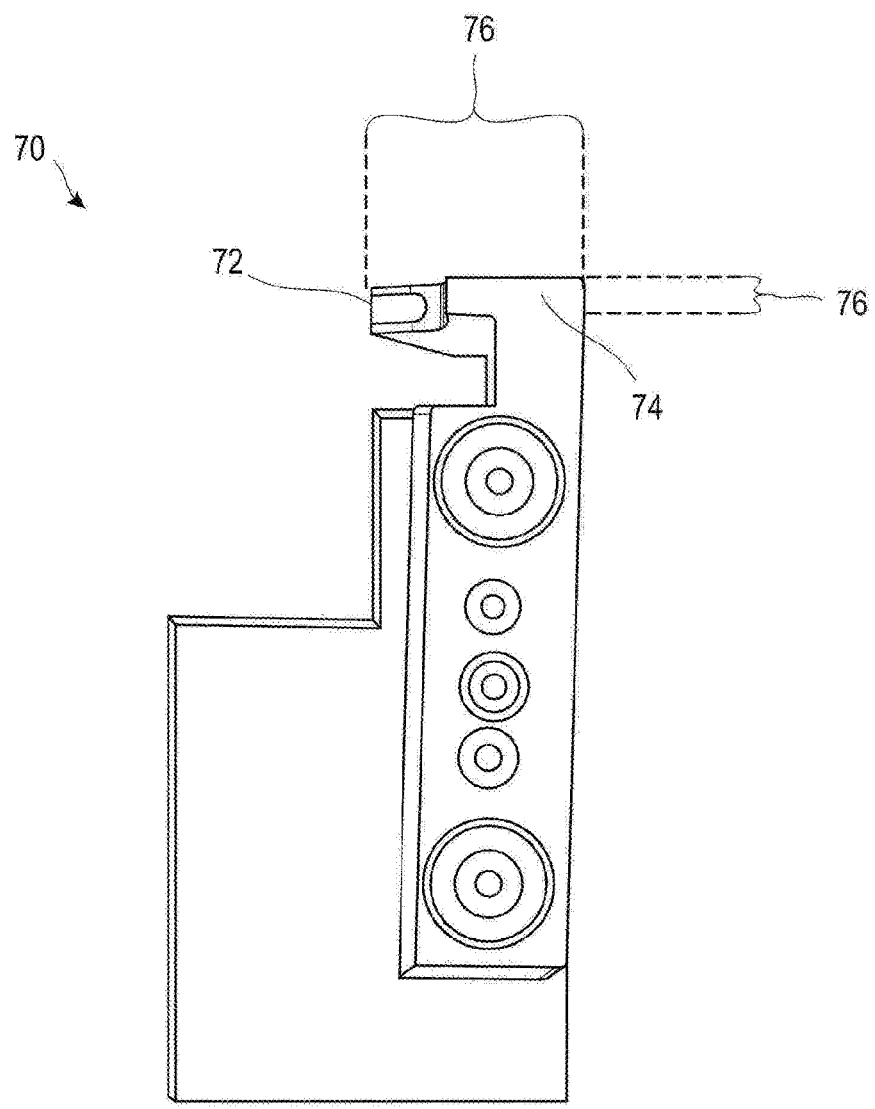
FIG. 5 shows an example cutting tool that may be used in a method of manufacturing the new nozzle ring shown in FIGS. 2A to 2C.

The finishing or machining of the manufacturing intermediate may be achieved as a turning process by rotating the manufacturing intermediate about its axis while a cutting portion of a cutting tool is moved radially outwards to form the second gap 38. An example of suitable cutting tool 70 is shown in FIG. 5. The second gap 38 (defined between the generally annular wall 18 and the two protrusions 30, 32) may be at least partially formed and/or finished using the cutting tool 70, as follows. The cutting tool 70 comprises a cutting portion 72 and a support portion 74 that together define a head portion 76 of the cutting tool 70. The head portion 76 is moved axially through the radial gap 58 defined between distal ends of the two protrusions 30, 32 and the other one of the inner or outer flange 19, 20. The head portion 76 is then moved radially towards the two protrusions 30, 32 such that the cutting portion 72 forms or finishes the second gap 38.

Alternatively, finishing of machining of the manufacturing intermediate may be achieved by electrochemical machining.

Optionally, the method of forming the nozzle ring 112 may further comprise finishing or machining a manufacturing intermediate to at least partially form the first gap 36 between two protrusions 30, 32 that extend from one of the inner or outer flange 19, 20 partially towards the other one of the inner or outer flange 19, 20.

In the above-described embodiments, the nozzle ring 112 comprises two discrete engagement features (each comprising a pair of protrusions 30, 32). In some alternative embodiments, one of the protrusions of the first engagement feature may be integrally formed with one of the protrusions of the second engagement feature. In some embodiments, each of the first set of protrusions may be integrally formed with a different one of the second set of protrusions. For example, referring to FIG. 2B, a first protrusion 30 of the engagement feature at the top of FIG. 2B may be integrally formed with a second protrusion 32 of the engagement feature at the bottom of FIG. 2B. Similarly, a second protrusion 32 of the engagement feature at the top of FIG. 2B may be integrally formed with a first protrusion 30 of the engagement feature at the bottom of FIG. 2B. Such an embodiment may use more material than the above-described embodiment, however, it may make the manufacturing process simpler.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A nozzle ring for a variable geometry turbine, the nozzle ring comprising:
   an annular wall;
   an inner flange that is perpendicular to the annular wall, and which extends from a radially inner edge of the annular wall;
   an outer flange that is perpendicular to the annular wall, and which extends from a radially outer edge of the annular wall; and
   two protrusions extending from one of the inner or outer flange towards the other one of the inner or outer flange, at least one of the two protrusions extending only partially towards the other one of the inner or outer flange, wherein both of the two protrusions extend either from the inner flange or from the outer flange;
   wherein the two protrusions define a first gap therebetween; and
   wherein the annular wall and the two protrusions define a second gap between the annular wall and both of the two protrusions.

2. The nozzle ring of claim 1 wherein the inner and outer flanges extend further from the annular wall than the two protrusions.

3. The nozzle ring of claim 1 wherein the two protrusions are integrally formed with the one of the inner and outer flanges from which they extend.

4. The nozzle ring of claim 1 wherein both of the two protrusions extend only partially towards the other one of the inner or outer flange.

5. The nozzle ring of claim 1 wherein a radial extent of the at least one of the two protrusions extending only partially towards the other one of the inner or outer flange is between 0.25 and 0.5 times a radial distance between the inner flange and the outer flange.

6. The nozzle ring of claim 1 wherein the annular wall supports an array of circumferentially spaced inlet vanes each of which extends axially away from a surface of the annular wall opposite from the inner and outer flanges.

7. The nozzle ring of claim 1 wherein a plurality of axially extending apertures are provided through the annular wall.

8. The nozzle ring of claim 7 wherein at least some of the axially extending apertures provided through the annular wall are located between the inlet vanes.

9. The nozzle ring of claim 1 further comprising a second set of two protrusions extending from one of the inner or outer flange towards the other one of the inner or outer flange, at least one of the second set of two protrusions extending only partially towards the other one of the inner or outer flange;
   wherein the two protrusions of the second set define a third gap therebetween; and
   wherein the annular wall and the two protrusions of the second set define a fourth gap between the annular wall and both of the two protrusions of the second set.

10. A variable geometry turbine comprising:
    a housing;
    a turbine wheel supported in the housing for rotation about an axis;
    a nozzle ring according to claim 1;
    a cavity provided in the housing for receipt of the inner and outer flanges of the nozzle ring, the nozzle ring being axially movable relative to the housing to vary the extent to which the inner and outer flanges of the nozzle are received in the cavity; and
    an inlet passageway extending radially inwards towards the turbine wheel and defined between a face of the annular wall of the nozzle ring and an opposing wall of the housing, such that said axial movement of the nozzle ring relative to the housing varies the axial width of the inlet passageway.

11. A turbocharger comprising the variable geometry turbine of claim 10.

12. A method of manufacturing a nozzle ring for a variable geometry turbine, the method comprising:
    forming a manufacturing intermediate, the manufacturing intermediate comprising:
      an annular wall;
      an inner flange that is perpendicular to the annular wall, and which extends from a radially inner edge of the annular wall to a distal end of the inner flange;
      an outer flange that is perpendicular to the annular wall, and which extends from a radially outer edge of the annular wall to a distal end of the outer flange; and
      at two protrusions extending from:
        one of the inner or outer flange partially towards the other one of the inner or outer flange such that both of the at least two protrusions extend either from the inner flange or from the outer flange; and
        the annular wall partially towards the distal ends of the inner and outer flanges; and
    finishing the manufacturing intermediate to form a gap between the annular wall and the at least one protrusion so as to form the nozzle ring.

13. The method of claim 12 further comprising:
    finishing the manufacturing intermediate to at least partially form a gap between two protrusions that extend from one of the inner or outer flange partially towards the other one of the inner or outer flange.

* * * * *